US 6,606,241 B2

(12) United States Patent
Moore

(10) Patent No.: US 6,606,241 B2
(45) Date of Patent: Aug. 12, 2003

(54) EJECTION BAY STRUCTURE FOR PORTABLE COMPUTERS

(75) Inventor: Earl W. Moore, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 165 days.

(21) Appl. No.: 09/896,411

(22) Filed: Jun. 29, 2001

(65) Prior Publication Data

US 2003/0011978 A1 Jan. 16, 2003

(51) Int. Cl.[7] ............................................. G06F 7/20
(52) U.S. Cl. ...................... 361/685; 361/683; 361/684; 312/331.1; 292/19
(58) Field of Search ................................ 361/684, 685, 361/725–727, 740, 747, 753; 439/152, 155, 159, 169, 353, 377, 374, 928.1; 364/708.1; 312/332.1, 333, 319.1; 292/19, 87, 91

(56) References Cited

U.S. PATENT DOCUMENTS

| | | | |
|---|---|---|---|
| 5,278,730 A | | 1/1994 | Kikinis |
| 5,305,180 A | | 4/1994 | Mitchell et al. |
| 5,363,273 A | | 11/1994 | Ma |
| 5,515,237 A | | 5/1996 | Ogami et al. |
| 5,606,519 A | | 2/1997 | Viletto |
| 5,740,012 A | * | 4/1998 | Choi ........................... 361/686 |
| 5,765,933 A | * | 6/1998 | Paul et al. ................. 312/332.1 |
| 5,825,616 A | * | 10/1998 | Howell et al. ............... 361/684 |
| 5,841,631 A | * | 11/1998 | Shin et al. ................... 361/684 |
| 5,978,212 A | * | 11/1999 | Boulay et al. ............... 361/685 |
| 6,064,567 A | | 5/2000 | Cheng |
| 6,108,199 A | | 8/2000 | Bonardi et al. |
| 6,122,163 A | * | 9/2000 | Stone et al. ................. 361/685 |
| 6,185,103 B1 | | 2/2001 | Yamada |
| 6,224,996 B1 | | 5/2001 | Bovio et al. |
| 6,332,658 B1 | * | 12/2001 | Sato et al. ................. 312/223.2 |
| 6,392,879 B1 | * | 5/2002 | Chien .......................... 361/685 |
| 6,490,153 B1 | * | 12/2002 | Casebolt et al. ............ 361/685 |

\* cited by examiner

Primary Examiner—Michael Datskovsky

(57) ABSTRACT

An apparatus for inserting a computer component into, and removing the computer component from, a bay of a computer, includes a first frame member adapted for movement between retracted and extended positions. The first frame member has a pull bar adapted for grasping by a user for moving the first frame member to at least the extended position. A first locking member is adapted for movement with the computer component and a second locking member is stationary with respect to the first frame member. The first and second locking members are mutually engageable when the first frame member is in the retracted position for preventing movement of the computer component out of the bay. Movement of the first frame member from the retracted position toward the extended position causes the first and second locking members to disengage and release the computer component from the bay.

37 Claims, 7 Drawing Sheets

EJECTION BAY STRUCTURE FOR PORTABLE COMPUTERS

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to computers, and more particularly to ejection bay structures for portable computers for receiving and ejecting computer components such as floppy drives, hard drives, batteries, and the like.

2. Description of the Related Art

Portable computers, such as laptop and notebook computers, typically have one or more drive bays for interchangeably receiving computer components, such as floppy drives, hard drives, CD and DVD drives, batteries, LAN communication devices, modems, RAM memory, FAX communication devices, and so on. Often, it is difficult for the user to readily and easily swap and/or remove components from the bays. Typically, a peripheral component, such as a floppy disk or hard drive, is retained in a drive frame by a spring-loaded latch that is mounted in the computer adjacent the bay. A release button extends out of the computer housing and is operable to release the latch when pressed in order to remove the peripheral component. When the release button is pressed, the drive frame moves toward the bay opening under bias force to thereby expose a portion of the drive frame outside of the computer housing. The drive can then be pulled out of the bay. This method forces a user to use both hands to eject the drive, e.g. one hand to activate the release button and the other hand to pull the drive.

It would therefore be desirable to provide a drive bay mechanism that reduces or eliminate exposure of the drive frame and requires only one hand to eject the drive or other computer component.

SUMMARY OF THE INVENTION

According to one aspect of the invention, an apparatus for inserting a computer component into, and removing the computer component from, a bay of a computer, includes a first frame member adapted for movement between retracted and extended positions. The first frame member has a pull bar adapted for grasping by a user for moving the first frame member to at least the extended position. A first locking member is adapted for movement with the computer component and a second locking member is stationary with respect to the first frame member. The first and second locking members are mutually engageable when the first frame member is in the retracted position for preventing movement of the computer component out of the bay. Movement of the first frame member from the retracted position toward the extended position causes the first and second locking members to disengage and release the computer component from the bay.

According to a further aspect of the invention, a portable computer comprises a computer housing and a bay formed in the computer housing. A first frame member is located in the bay and moveable between retracted and extended positions with respect to the computer housing. The first frame member has a pull bar adapted for grasping by a user for moving the first frame member to at least the extended position. A computer component is removably positioned in the first frame member and a first locking member is connected to the computer component. A second locking member is stationary with respect to the first frame member. The first and second locking members are mutually engageable when the first frame member is in the retracted position for preventing movement of the computer component out of the bay. Movement of the first frame member from the retracted position toward the extended position causes the first and second locking members to disengage and release the computer component from the bay.

BRIEF DESCRIPTION OF THE SEVERAL VIEWS OF THE DRAWINGS

Embodiments of the present invention will hereinafter be described in conjunction with the appended drawings, wherein.

Embodiments of the present invention will now be described in greater detail with reference to the drawings, wherein like parts throughout the drawing figures are represented by like numerals.

DETAILED DESCRIPTION OF THE INVENTION

Figure 1:
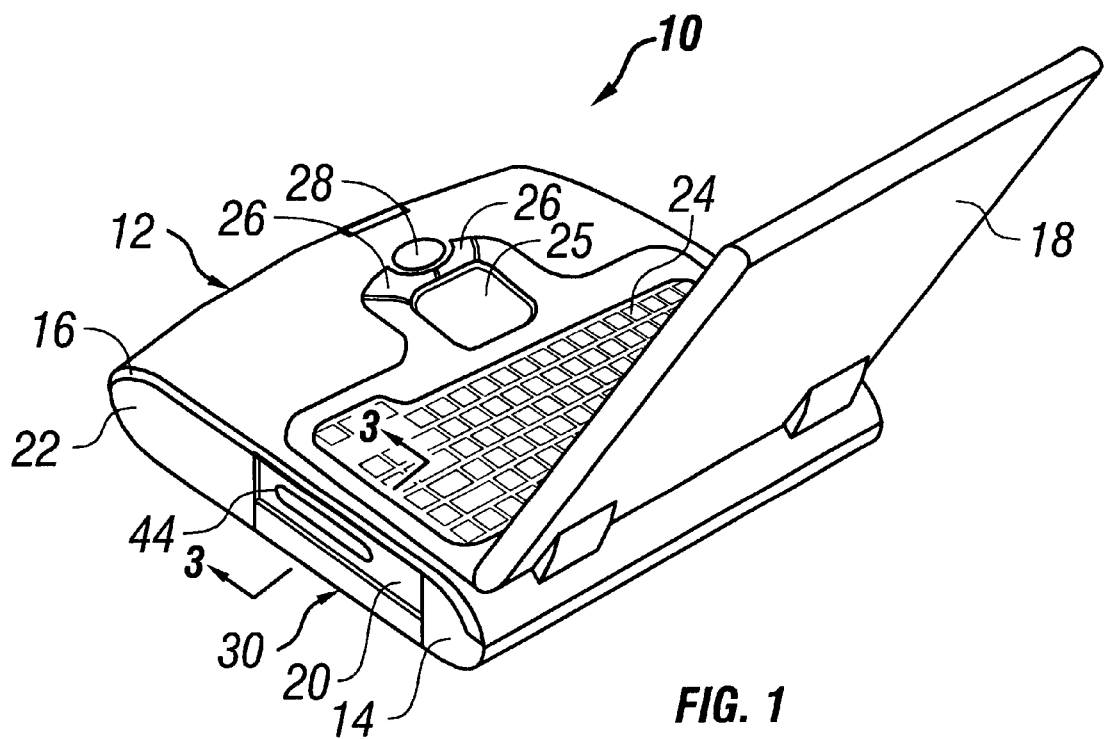
FIG. 1 is a rear perspective view of a portable computer incorporating a drive bay assembly according to one embodiment of the present invention.

Referring now to the drawings, and to FIG. 1 in particular, a portable computer 10 according to an embodiment of the present invention, such as a laptop or notebook computer, has a housing 12 comprising a base portion 14 and a deck portion 16 connected to the base portion. A display screen 18 is pivotally connected to the housing 12. A computer component 20, shown here as a floppy disk drive, is accessible from a side 22 of the base portion 14, and is removably installed in a drive bay assembly 30 (FIG. 2) of the computer 10. The deck portion 16 preferably includes a keyboard assembly 24, a touch pad 25 for directing cursor movement on the display screen 18, selector buttons 26, and a control button 28 adjacent the selector buttons that can be actuated in one of four directions to control cursor movement.

Figure 2:
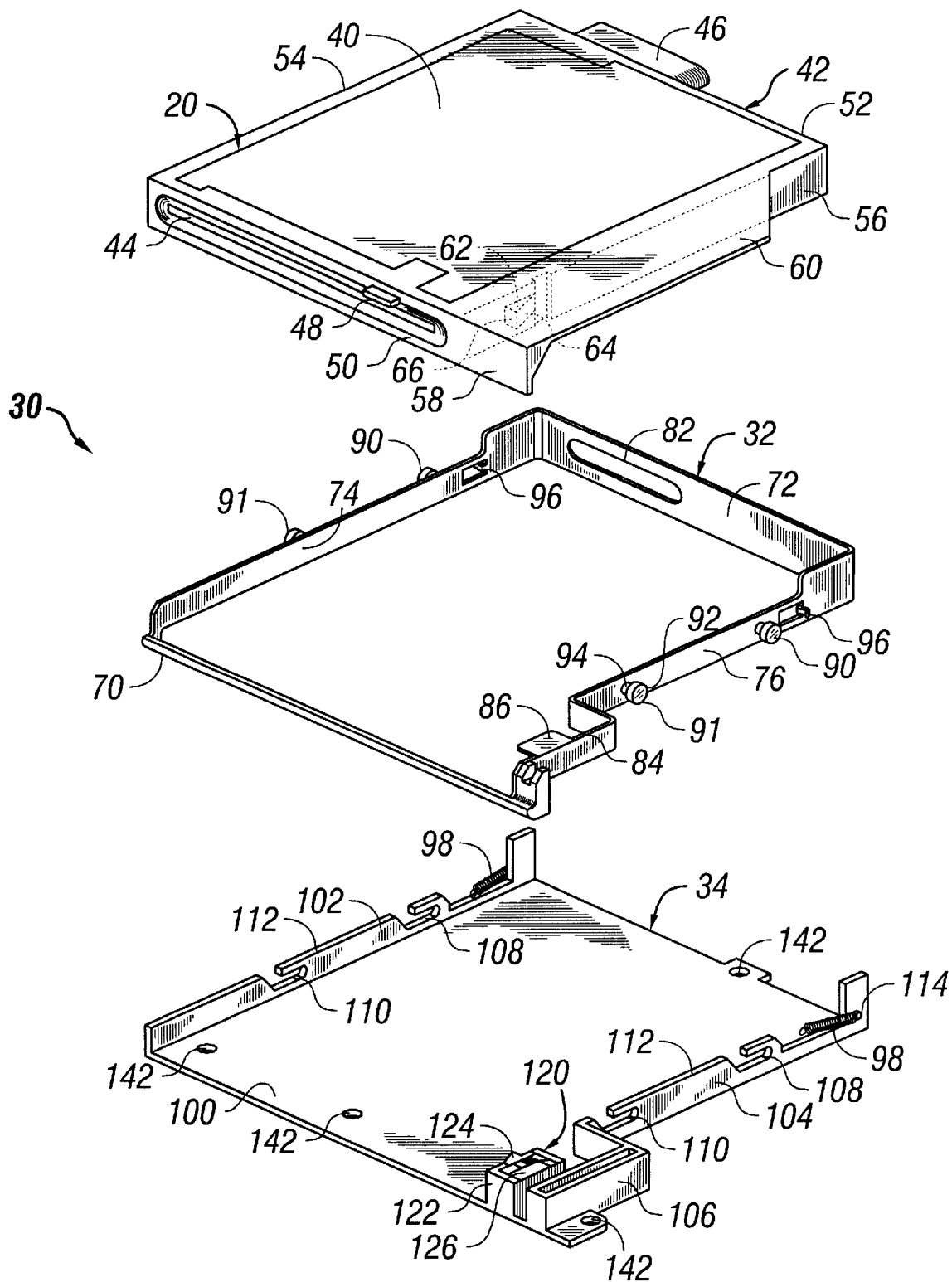
FIG. 2 is a front perspective exploded view of the drive bay assembly and a computer drive device for installation in the drive bay assembly according to an embodiment of the present invention.

As shown in FIG. 2, the drive bay assembly 30 includes an upper frame 32 and a lower frame 34 that receives the upper frame. Preferably, the upper frame 32 is stamped and formed from sheet metal and the lower frame 34 is formed of a molded plastic material. The drive 20 is received in the upper frame 32, as will be described in greater detail below.

The drive 20 includes a drive housing 40 that is preferably secured within a housing frame 42. The drive 20 is of well known construction and includes an opening 44 at a forward end of the housing 40 that receives a floppy disk (not shown) and a plug-in connector 46 at a rearward end of the housing 40 that electrically connects the drive 20 to a mating connector (not shown) inside the computer 10. An ejection button 48 is provided at the forward end of the housing 40 for ejecting the floppy disk. Although the drive 20 is shown and described as a floppy disk drive, it is to be understood that other computer components, such as hard drives, CD drives, DVD drives, batteries, LAN communication devices, modems, RAM memory, FAX communication devices, and so on, can be adapted for mounting in the drive bay assembly 30.

The housing frame 42 includes a front wall or bezel 50, a rear wall 52, and side walls 54, 56 extending between the bezel 50 and the rear wall 56. The bezel 50 together with the rear wall 52 and side walls 54, 56 encompass the drive housing 40. Preferably, a portion 58 of the bezel 50 extends beyond the side wall 56 and an upper wall 60 extends between the bezel portion 58 and the side wall 56. The housing frame 42 is preferably constructed of molded plastic material, although other materials and forming processes can be used. A locking member or catch 62 (shown in hidden line) is preferably integrally formed in the side wall 56 below the upper wall 60 and includes a ramped surface 64 that extends at an acute angle from the side wall 56 and a locking surface 66 that extends between the ramped surface and the side wall 56. Preferably, the locking surface 66 is perpendicular to the side wall 56.

The upper frame 32 includes a front wall or pull bar 70, a rear wall 72, and side walls 74, 76 extending between the pull bar 70 and the rear wall 72. The pull bar 70 together with the rear wall 72 and side walls 74, 76 encompass a substantial portion of the drive housing 40 and housing frame 42.

Figure 3:
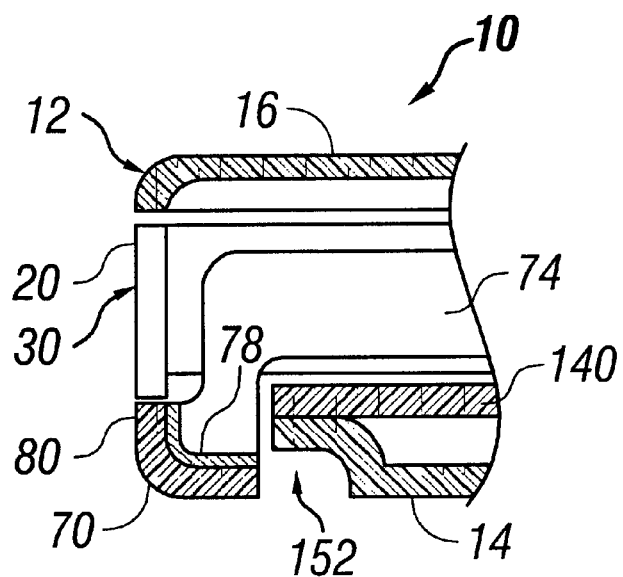
FIG. 3 is a sectional view of the portable computer taken along line 3—3 of FIG.

As shown in FIG. 3, the pull bar 70 is preferably constructed of an inner reinforcing bar portion 78 and an outer aesthetic bar portion 80 that conforms in shape to the base portion 14. Preferably, the reinforcing bar portion 78 is constructed of metal and the aesthetic bar portion 80 is constructed of plastic and attached to the bar portion 78 through heat staking or other well known fastening techniques.

Figure 4:
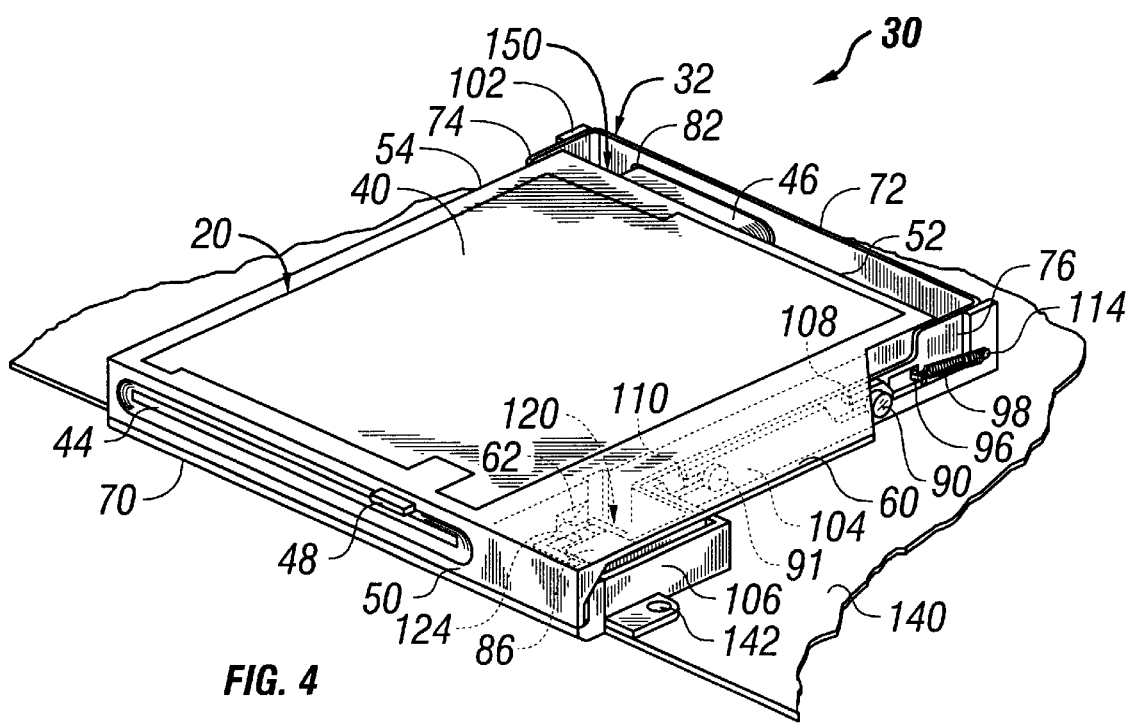
FIG. 4 is a view similar to FIG. 2 with the drive bay assembly and computer drive device in an assembled condition.

Referring now to FIGS. 2 and 4, the rear wall 72 of the upper frame 32 includes an elongate opening 82 that receives the connector 46 of the drive 20 when the drive is installed in the upper frame 32. The side wall 76 has a side wall portion 84 that protrudes outwardly from a longitudinal center of the upper frame 32. A tab 86 is connected to an upper edge of the side wall portion 84 and extends inwardly toward the longitudinal center of the upper frame 32. A boss 88 (shown in hidden line in FIG. 6) extends downwardly from the tab 86. The function of the boss 88 will be described in greater detail below. Spaced pins 90 and 91 extend outwardly from each side wall 74, 76 and engage the lower frame 34, as will be described in greater detail below. The pins 90 include a shaft 94 with an inner end connected to its associated side wall 74, 76 and a head 92 at an outer free end of the shaft. A hook 96 extends generally outwardly from each side wall 74, 76 rearwardly of the pins 90 for receiving a forward end of a spring 98.

The lower frame 34 includes a bottom wall 100 with side walls 102, 104 that extend along opposite longitudinal edges of the bottom wall 100. The side wall 104 has a side wall portion 106 that protrudes outwardly from a longitudinal center of the lower frame 34. Each side wall 102, 104 has spaced longitudinally extending slots 108 and 110 that open to an upper edge 112 of the side walls. The slots 108 and 110 are sized to receive the shaft 94 of the pins 90 and 91, respectively, when the upper frame 32 is mounted in the lower frame 34. The pins 90 and 91 cooperate with the slots 108 and 110, respectively, to guide sliding movement of the upper frame 32 in the longitudinal direction with respect to the lower frame 34. A peg 114 extends outwardly from each side wall 102, 104 at a rearward end thereof for receiving and holding a rearward end of the spring 98. The spring 98 biases the upper frame 32 to a retracted rest position.

Figure 6:
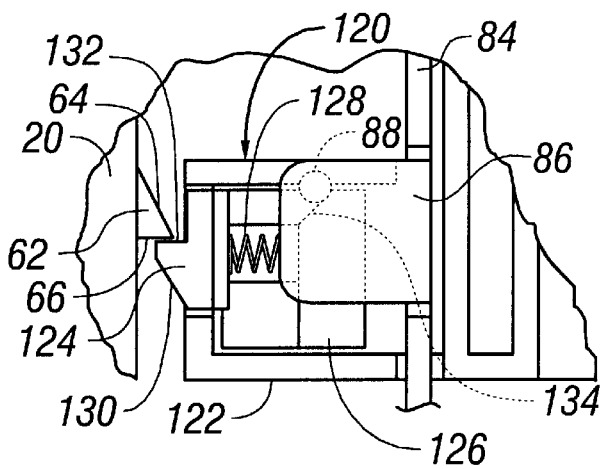
FIG. 6 is an enlarged top plan view of a retention mechanism that forms part of the drive bay assembly, with the retention mechanism in a locked position.

With additional reference to FIG. 6, a locking mechanism 120 is connected to the bottom wall 100 adjacent the side wall portion 106. The locking mechanism 120 has a compartment 122 that houses a latch 124 and a slide 126 connected to the latch 124, preferably through a coil spring 128. The latch 124 includes a ramped surface 130 that is adapted to contact the ramped surface 64 of the catch 62 (FIG. 10) during insertion of the drive 20 into the computer 10 and a stop surface 132 that is adapted to contact the locking surface 66 of the catch 62 for holding the drive 20 in the computer. The slide 126 has a camming surface 134 (shown in hidden line) that is normally in contact with the boss 88 of the upper frame 32.

The lower frame 34 is preferably mounted to a printed circuit board (PCB) 140 (FIG. 4) through fasteners (not shown) that extend through mounting openings 142 (FIG. 2) in bottom wall 100 of the lower frame 34 and corresponding openings (not shown) in the PCB 140 in a well-known manner. It will be understood that other means for mounting the lower frame 34 to the portable computer 10 can be provided.

Figure 5:
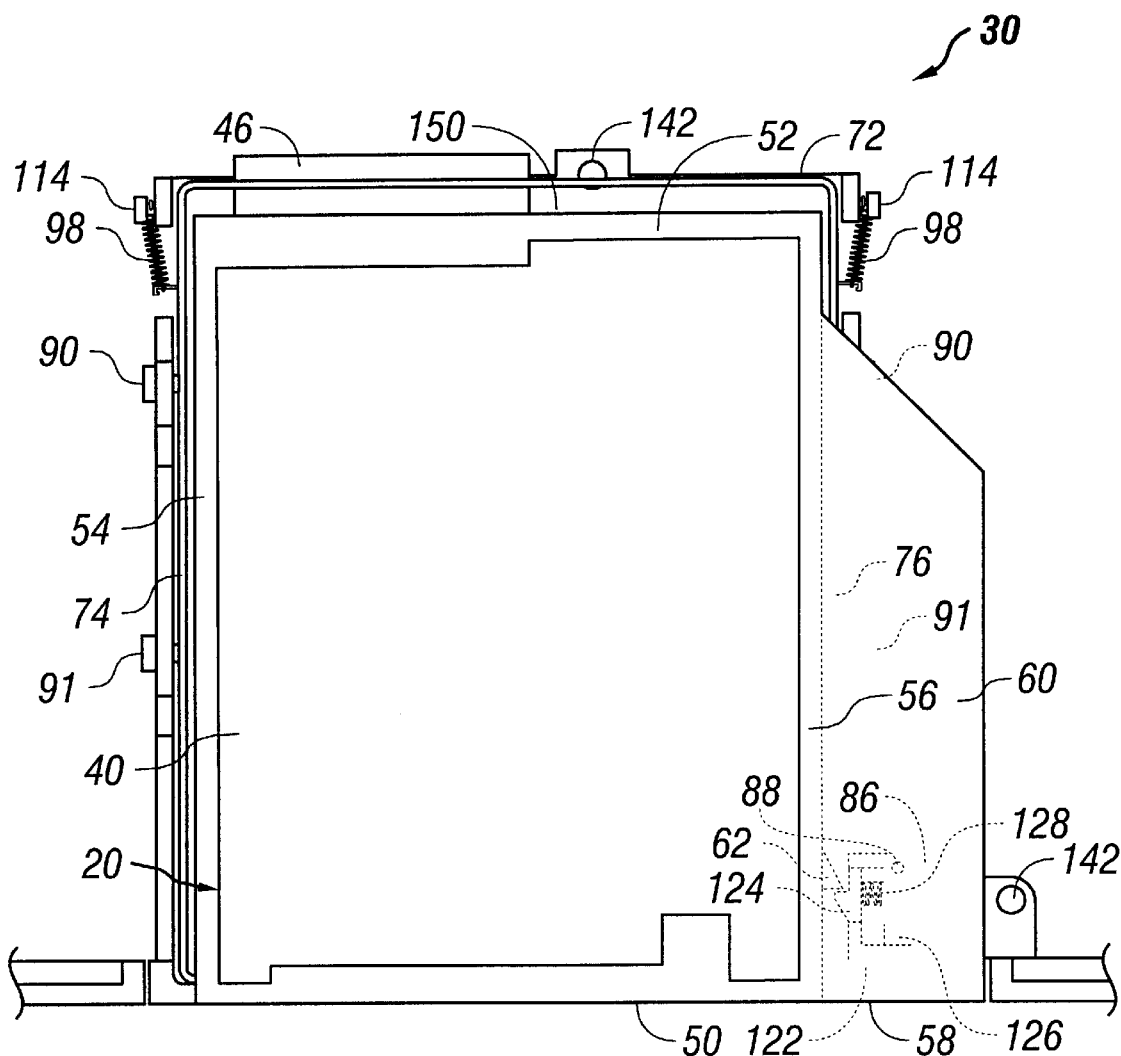
FIG. 5 is a top plan view of the drive bay assembly in a rest or home position according to an embodiment of the present invention.

During use of the drive 20, the upper frame 32 is in the retracted or rest position and the drive 20 is initially located in the upper frame, as shown in FIGS. 4 and 5, with the drive 20 electrically connected to the computer 10 through the connector 46. The drive 20 is also mechanically locked in the drive bay assembly 30 due to interference between the stop surface 132 of the latch 124 and the locking surface 66 of the catch 62, as shown most clearly in FIG. 6. In this position, a gap 150 (FIG. 5) is located between the rear wall 52 of the housing frame 42 and the rear wall 72 of the upper frame 32.

Figure 8:
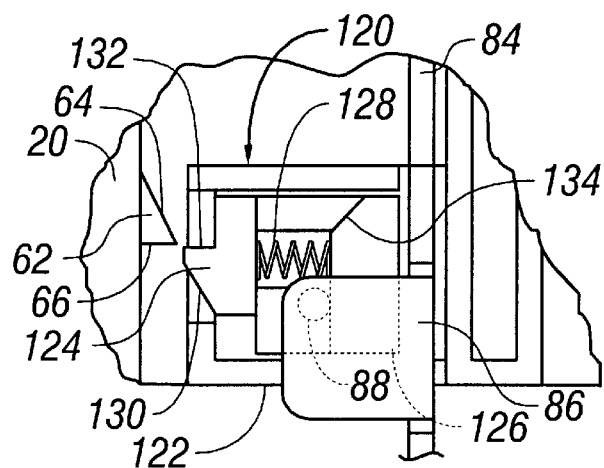
FIG. 8 is a view similar to FIG. 6 with the retention mechanism in an unlocked position.
Figure 7:
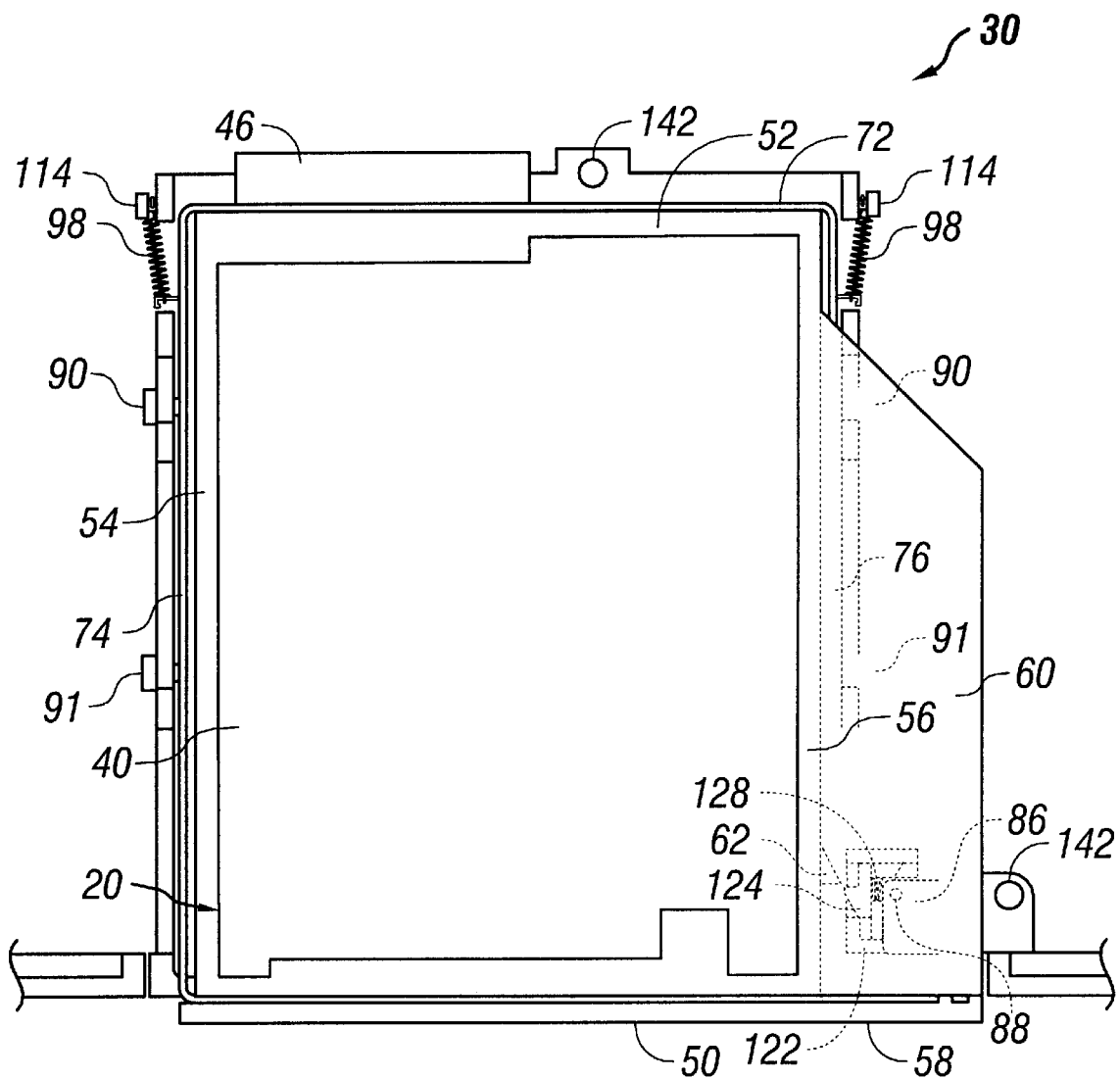
FIG. 7 is a view similar to FIG. 5 of the drive bay assembly in an ejection position.
Figure 9:
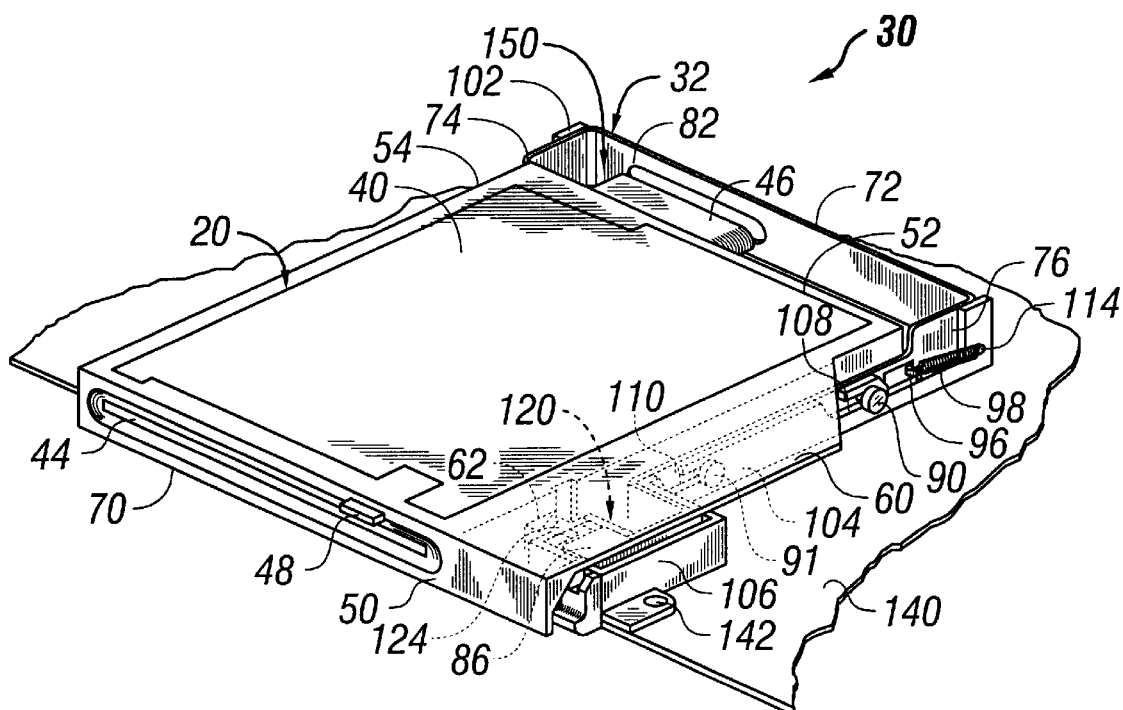
FIG. 9 is a front perspective view of the drive bay assembly and the computer drive device similar to FIG. 4, with the computer drive device in an ejected position.

When it is desirous to remove the drive 20 from the computer 10, the pull bar 70 can be grasped by positioning one or more fingers in a depression 152 (FIG. 3) formed in the bottom wall of the base portion 14 and pulling the pull bar outwardly from the side 22 of the computer 10. As the pull bar 70 moves outwardly, the upper frame 32 moves outwardly against bias from the springs 98 to close the gap 150 between the rear wall 52 of the housing frame 42 and the rear wall 72 of the upper frame 32, as shown in FIG. 7. Simultaneously, the boss 88 (FIG. 6) travels with the upper frame 32 against the camming surface 134 of the slide 126 to move the latch 124 away from the catch 62, as shown in FIG. 8. Preferably, the camming surface 134 is angled to provide relatively quick disengagement of the latch 124 and catch 62 with relatively little movement of the upper frame 32 toward the extended position. Further outward movement of the upper frame 32 causes the rear wall 72 to bear against the rear wall 52 of the housing frame and move the drive 20 a relatively small distance out of the computer 10. Upon release of the pull bar 70, the upper frame 32 will return to its retracted position inside the computer 10 and a sufficient portion of the drive 20 will be exposed for grasping and removal, as shown in FIG. 9.

Figure 10:
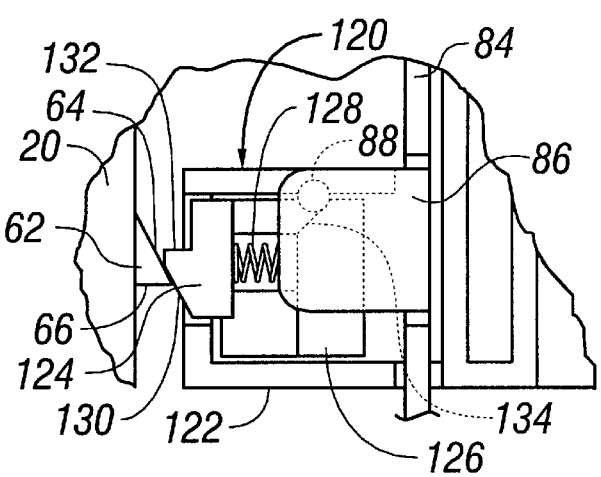
FIG. 10 is an enlarged top plan view of the retention assembly during insertion of the drive device into the drive bay assembly.

During insertion of the drive 20 in the drive bay assembly 30, as shown in FIG. 10, the ramped surface 64 of the catch 62 will contact and slide against the ramped surface 130 of the latch 124 and push the latch away from the drive 20 under bias force from the spring 128. When the catch 62 clears the latch 124, the latch will spring back under bias force from the spring 128 to its extended position as shown in FIG. 6, to thereby lock the drive 20 in the drive bay assembly 30. In this position, the plug-in connector 46 (FIG. 4) of the drive 20 is electrically connected to a mating connector (not shown) inside the computer 10. The drive 20 is thus ready for use.

It will be understood that the terms forward, rearward, upper, lower, outwardly, inwardly, and their respective derivatives and equivalent terms as may be used throughout the specification refer to relative, rather than absolute orientations and/or positions.

While the invention has been taught with specific reference to the above-described embodiments, those skilled in the art will recognize that changes can be made in form and detail without departing from the spirit and the scope of the invention. By way of example, the position of the catch 62 and latch 124 can be reversed, such that the catch 62 is stationary with respect to the computer 10 and the latch 124 is mounted for movement with the drive 20. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus for inserting a computer component into, and removing the computer component from, a bay of a computer, the apparatus comprising:
    a first frame member adapted for movement between retracted and extended positions, the first frame member having a pull bar adapted for grasping by a user for moving the first frame member to at least the extended position;
    a first locking member being adapted for movement with the computer component;
    a second locking member being stationary with respect to the first frame member;
    the first and second locking members being mutually engageable when the first frame member is in the retracted position for preventing movement of the computer component out of the bay;
    wherein movement of the first frame member from the retracted position toward the extended position causes the first and second locking members to disengage, thereby releasing the computer component from the bay.

2. An apparatus according to claim 1, wherein the first frame member comprises a contact member that is spaced from a contact surface of the computer component, the contact member being adapted to engage the contact surface of the computer component at least simultaneously with or after disengagement of the first and second locking members to thereby push the computer component at least partially out of the bay.

3. An apparatus according to claim 2, wherein the contact member is a rear wall of the first frame member.

4. An apparatus according to claim 2, wherein the first frame member is biased toward the retracted position to thereby expose at least a portion of the computer component when the pull bar is released by the user.

5. An apparatus according to claim 1, and further comprising a second frame member that that slidably receives the first frame member for movement of the first frame member between the retracted and extended positions.

6. An apparatus according to claim 5, and further comprising at least one spring extending between the first and second frame members for biasing the first frame member to the retracted position.

7. An apparatus according to claim 6, wherein the first locking member comprises a catch and the second locking member comprises a latch that is slidably mounted to the second frame member for movement between a first position wherein the latch and the catch are mutually engaged and a second position wherein the latch and the catch are disengaged.

8. An apparatus according to claim 7, wherein the first frame includes a boss and the second locking member includes a camming surface engageable with the boss during movement of the first frame from the retracted position toward the extended position to thereby move the latch from the first position to the second position.

9. An apparatus according to claim 8, wherein the latch is biased toward the first position.

10. An apparatus according to claim 9, wherein the latch has a first ramped surface and the catch has a second ramped surface that is adapted to contact the first ramped surface during insertion of the computer component into the bay to thereby push the latch toward the second position until the catch is clear of the latch.

11. An apparatus according to claim 10, wherein the latch has a first locking surface and the catch has a second locking surface that is adapted to engage the first locking surface when the latch is in the first position for preventing movement of the computer component out of the bay.

12. An apparatus according to claim 1, wherein the first locking member comprises a catch and the second locking member comprises a latch that is slidably mounted with respect to the catch for movement between a first position wherein the latch and catch are mutually engaged and a second position wherein the latch and catch are disengaged.

13. An apparatus according to claim 12, wherein the first frame includes a boss and the second locking member includes a camming surface engageable with the boss during movement of the first frame from the retracted position toward the extended position to thereby move the latch from the first position to the second position.

14. An apparatus according to claim 13, wherein the latch is biased toward the first position.

15. An apparatus according to claim 14, wherein the latch has a first ramped surface and the catch has a second ramped surface that is adapted to contact the first ramped surface during insertion of the computer component into the bay to thereby push the latch toward the second position until the catch is clear of the latch.

16. An apparatus according to claim 15, wherein the latch has a first locking surface and the catch has a second locking surface that is adapted to engage the first locking surface when the latch is in the first position for preventing movement of the computer component out of the bay.

17. An apparatus according to claim 12, wherein the latch has a first ramped surface and the catch has a second ramped surface that is adapted to contact the first ramped surface during insertion of the computer component into the bay to thereby push the latch toward the second position until the catch is clear of the latch.

18. An apparatus according to claim 17, wherein the latch has a first locking surface and the catch has a second locking surface that is adapted to engage the first locking surface when the latch is in the first position for preventing movement of the computer component out of the bay.

19. A portable computer comprising:

a computer housing;

a bay formed in the computer housing;

a first frame member located in the bay and moveable between retracted and extended positions with respect to the computer housing, the first frame member having a pull bar adapted for grasping by a user for moving the first frame member to at least the extended position;

a computer component removably positioned in the first frame member;

a first locking member being connected to the computer component;

a second locking member being stationary with respect to the first frame member;

the first and second locking members being mutually engageable when the first frame member is in the retracted position for preventing movement of the computer component out of the bay;

wherein movement of the first frame member from the retracted position toward the extended position causes the first and second locking members to disengage and release the computer component from the bay.

20. A portable computer according to claim 19, wherein the first frame member comprises a contact member that is spaced from a contact surface of the computer component, the contact member being adapted to engage the contact surface of the computer component at least simultaneously with or after disengagement of the first and second locking members to thereby push the computer component at least partially out of the bay.

21. A portable computer according to claim 20, wherein the contact member is a rear wall of the first frame member.

22. A portable computer according to claim 20, wherein the first frame member is biased toward the retracted position to thereby expose at least a portion of the computer component when the pull bar is released by the user.

23. A portable computer according to claim 19, and further comprising a second frame member that is stationary with respect to the computer housing, the first frame member being slidably received in the second frame member for movement of the first frame member between the retracted and extended positions.

24. A portable computer according to claim 23, and further comprising at least one spring extending between the first and second frame members for biasing the first frame member to the retracted position.

25. A portable computer according to claim 24, wherein the second locking member is connected to the second frame member.

26. A portable computer according to claim 25, wherein the first locking member comprises a catch and the second locking member comprises a latch that is slidably mounted to the second frame member for movement between a first position wherein the latch and catch are mutually engaged and a second position wherein the latch and catch are disengaged.

27. A portable computer according to claim 26, wherein the first frame includes a boss and the second locking member includes a camming surface engageable with the boss during movement of the first frame from the retracted position toward the extended position to thereby move the latch from the first position to the second position.

28. A portable computer according to claim 27, wherein the latch is biased toward the first position.

29. A portable computer according to claim 28, wherein the latch has a first ramped surface and the catch has a second ramped surface that contacts the first ramped surface during insertion of the computer component into the bay to thereby push the latch toward the second position until the catch is clear of the latch.

30. A portable computer according to claim 19, wherein the first locking member comprises a catch and the second locking member comprises a latch that is slidably mounted with respect to the catch for movement between a first position wherein the latch and catch are mutually engaged and a second position wherein the latch and catch are disengaged.

31. An apparatus according to claim 30, wherein the first frame includes a boss and the second locking member includes a camming surface engageable with the boss during movement of the first frame from the retracted position toward the extended position to thereby move the latch from the first position to the second position.

32. An apparatus according to claim 31, wherein the latch is biased toward the first position.

33. An apparatus according to claim 32, wherein the latch has a first ramped surface and the catch has a second ramped surface that contacts the first ramped surface during insertion of the computer component into the bay to thereby push the latch toward the second position until the catch is clear of the latch.

34. An apparatus according to claim 33, wherein the latch has a first locking surface and the catch has a second locking surface that engages the first locking surface when the latch is in the first position for preventing movement of the computer component out of the bay.

35. An apparatus according to claim 30, wherein the latch has a first ramped surface and the catch has a second ramped surface that contacts the first ramped surface during insertion of the computer component into the bay to thereby push the latch toward the second position until the catch is clear of the latch.

36. An apparatus according to claim 35, wherein the latch has a first locking surface and the catch has a second locking surface that engages the first locking surface when the latch is in the first position for preventing movement of the computer component out of the bay.

37. An apparatus according to claim 19, wherein the computer component is a floppy disk drive.

* * * * *